United States Patent [19]
Carpenter

[11] 4,367,143
[45] Jan. 4, 1983

[54] APPARATUS FOR MAGNETICALLY TREATING LIQUID FLOWING THROUGH A PIPE AND CLAMPING MEANS THEREFOR

[75] Inventor: Roland K. Carpenter, Roseville, Minn.

[73] Assignee: Aqua Magnetics, Inc., Minneapolis, Minn.

[21] Appl. No.: 270,109

[22] Filed: Jun. 3, 1981

[51] Int. Cl.³ .............................................. B01D 35/06
[52] U.S. Cl. .................................................... 210/222
[58] Field of Search ................................. 210/222, 223

[56] References Cited

U.S. PATENT DOCUMENTS

| | | | |
|---|---|---|---|
| 2,652,925 | 9/1953 | Vermeiren | 210/222 |
| 4,157,963 | 6/1979 | Jessop et al. | 210/222 |
| 4,210,535 | 7/1980 | Risk | 210/222 |
| 4,265,755 | 5/1981 | Zimmerman | 210/222 |

*Primary Examiner*—Benoît Castel
*Assistant Examiner*—Sharon T. Cohen
*Attorney, Agent, or Firm*—Peterson, Palmatier, Sturm, Sjoquist & Baker, Ltd.

[57] ABSTRACT

A casing containing a strip of ferromagnetic material has a pair of ceramic magnets at each end thereof associated with one of each pair of magnetics is a ferromagnetic shoe member that provides an angled pole face that bears against the outside of the pipe. These components are contained within the casing by a means of a potting compound.

10 Claims, 5 Drawing Figures

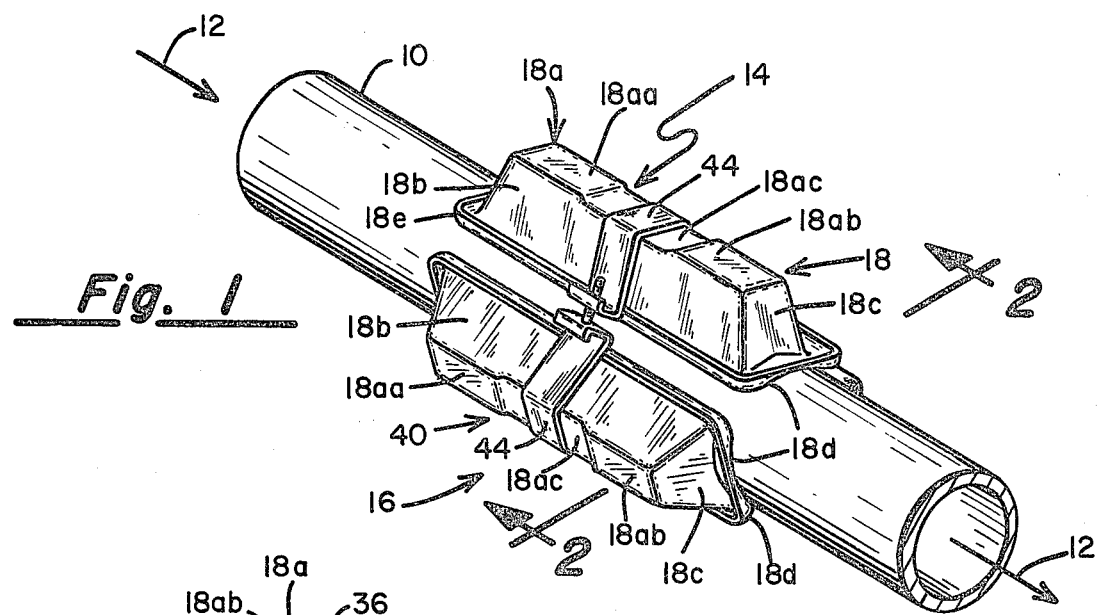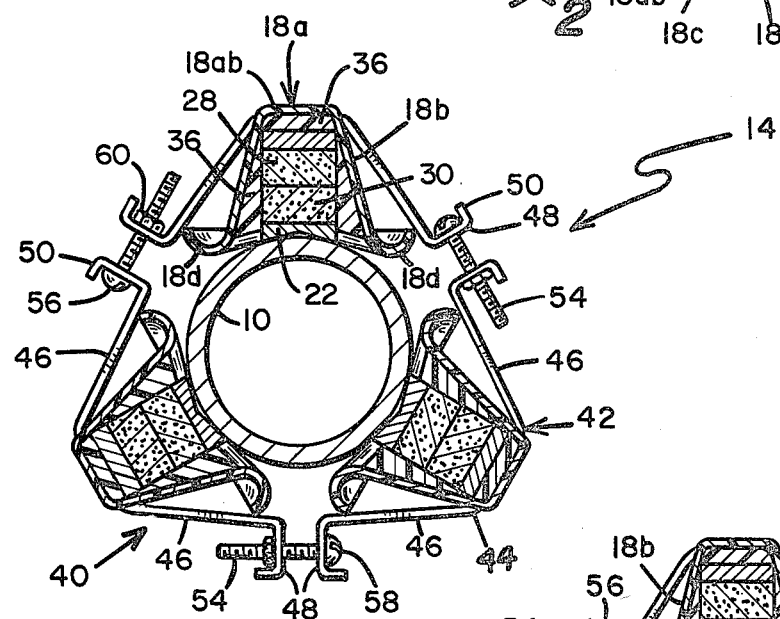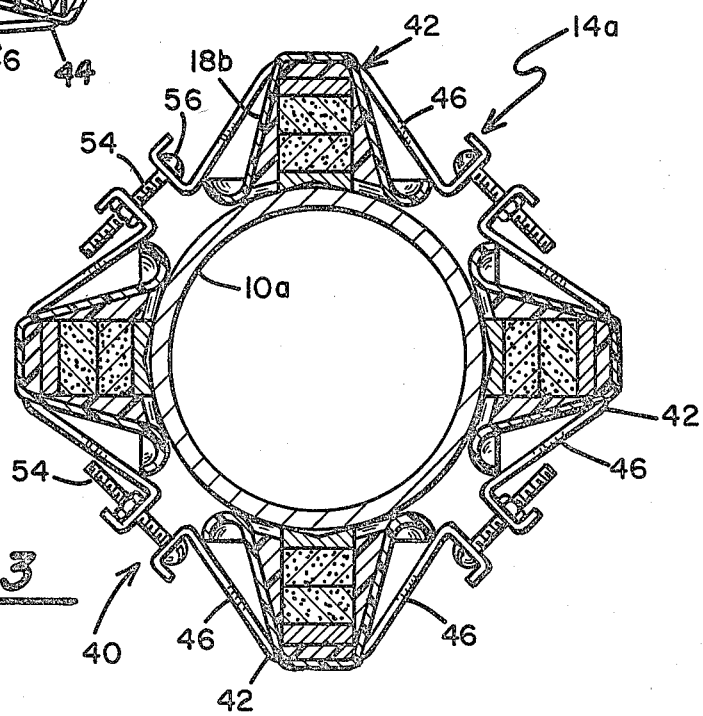

APPARATUS FOR MAGNETICALLY TREATING LIQUID FLOWING THROUGH A PIPE AND CLAMPING MEANS THEREFOR

BACKGROUND OF THE INVENTION

1. Field of the Invention

This invention relates generally to apparatus for magnetically treating a liquid as it flows through a pipe, and pertains more particularly to a self-contained permanent magnet unit with hardware means for clamping various combinations of such units to the outside of the pipe.

2. Description of the Prior Art

U.S. Pat. No. 3,228,878 granted on Jan. 11, 1966 to Dean L. Moody for "Method and Apparatus for Treatment of Flowing Liquids to Control Deposition of Solid Matter Therefrom" is believed representative of the state-of-the-art. Actually, the alluded-to patent presents an excellent description of how the treatment is effected where diamagnetic substances are contained in the liquid flowing through the pipe. The patent mentions scale and paraffin. Scale can take various forms but typical of the substances creating scale problems are calcium carbonate, calcium sulfate, barium sulfate, sodium chloride, magnesium sulfate, as well as various oils, waxes and greases in addition to paraffin.

As is recognized, inasmuch as the above-listed substances are diamagnetic, when subjected to a strong magnetic field, the field induces polarization in the substances in such a way that the diamagnetic molecule is repelled by the magnetic field and by other polarized diamagnetic molecules. This is characteristic of diamagnetic substances and advantage is taken of this physical phenomenon to prevent the formation of objectionable scale deposits on the inside of the pipe, for by inducing polarization as mentioned above, the diamagnetic substances are caused to move away from the inner surface of the pipe when under the influence of a sufficiently strong magnetic field equipped with magnetic means.

The difficulty in the past, however, has been with respect to providing a strong enough field, particularly on larger diameter pipes, so that a substantial proportion of the fluid flowing through the pipe is subjected to a field of such intensity and for a long enough period of time that the desired repulsion will be effected.

SUMMARY OF THE INVENTION

Accordingly, an important object of this invention is to provide a sufficiently strong magnetic field such that scale, paraffin and other salts are prevented from accumulating on the inside of the pipe or conduit through which the particular liquid is flowing. In this regard, it is an aim to provide individual units, each of which contains a plurality of permanent magnets and each of which units furnishes a high flux concentration.

Another object of the invention is to provide a unit comprised of permanent magnets that can be clamped to the outside of a pipe in whatever combinations prove most desirable for the particular size of pipe and the flow rate of the liquid passing therethrough. In other words, if the pipe is small, my invention enables only one or two magnetic units to be employed, yet when the diameter is appreciable, a correspondingly greater number of units can be applied.

Another object of my invention is to provide a type of unit and a clamping means therefor that will permit the unit to be applied without modifying the pipe or any plumbing associated therewith. More specifically, an aim of the invention is to allow the various units that are clamped in combination to be shifted when circumstances so require. In this latter regard, in industrial installations, a change or switch to a different liquid might very well warrant shifting the units to another location in the system. This can easily be achieved when practicing my invention. Also, the piping system itself might be altered at times, yet my invention is sufficiently flexible to compensate for changes.

Not only is my invention suitable for industrial applications, but it also will find utility in smaller scale applications, namely commercial, but also residential. Hence, my invention is truly versatile as far as its particular use is concerned.

Also, the invention has for an object the provision of apparatus that will produce a concentrated magnetic field that will extend over a sufficient length of the pipe so that the liquid flowing through the pipe will be subjected to the influence of the magnetic field for a longer period of time in contradistinction to having the field restricted to flow only transversely across the pipe which can involve a relatively short length of pipe in which the field acts on the flowing liquid for a lesser amount of time.

Yet another object is to provide a permanent magnet unit that will not be damaged readily, such as by applying too much clamping pressure. More specifically, an aim of the invention is to utilize external hardware that acts in a direction to develop compressive forces in holding the various units against the outside of the pipe, doing so in a manner that will not impose undue stresses that might result in damage or separation of the unit's parts.

Also, the invention has for an object the provision of a permanent magnet unit and hardware therefor that can be rather inexpensively manufactured, thereby encouraging its widespread use for various applications.

Briefly, my invention envisages the use of an appropriate number of permanent magnet units of identical construction. Each unit comprises a casing containing therein a strip of ferromagnetic material, such as soft iron, with a pair of ceramic magnets at each end thereof. Associated with one of each pair of magnets is a ferromagnetic shoe member, also of soft iron, that provides an angled pole face that bears against the outside of the pipe, the shoe actually projecting somewhat from the potting compound in which the strip and permanent magnets are embedded.

The outside of the casing has an intermediate notch in one wall thereof and also has a peripherally directed trough or channel-shaped edge. The notch is formed so that a central portion or bight of a generally U-shaped metal clamping strap can nest in the notch. The ends of the legs of the U-shaped clamping strap are provided with outwardly directed feet, each foot having an integral flange extending generally parallel to the leg to which its foot is attached. Each foot has a hole therein for the accommodation of a bolt member. The flange in each foot is spaced sufficiently from the end of the leg so as to prevent the nut for each bolt from turning, the bolt in each instance having a slotted head so that it can be tightened with a screwdriver.

BRIEF DESCRIPTION OF THE DRAWINGS

FIG. 1 depicts my invention in an actual use, three magnet units being clamped to the length of pipe there shown;

FIG. 2 is a sectional view taken in the direction of line 2—2 of FIG. 1;

FIG. 3 is a sectional view corresponding to FIG. 2 but showing four units instead of the three units appearing in FIG. 2;

DESCRIPTION OF THE PREFERRED EMBODIMENT

Figure 4:
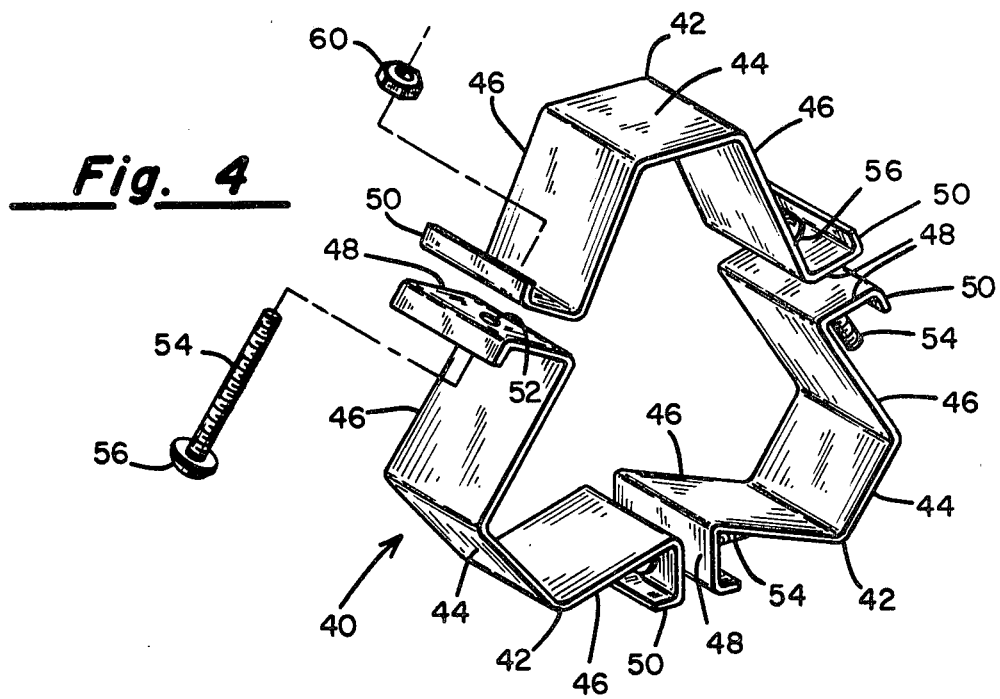
FIG. 4 is an enlarged perspective view taken at the same angle as FIG. 1 but illustrating only the clamping hardware, one of the bolts and nuts being detached.

Referring now to the drawings, it will be observed that in FIGS. 1 and 2 a length of pipe has been illustrated, having been given the reference numeral 10. For the sake of discussion, the pipe 10 may be deemed to have a 2-inch diameter, whereas the pipe 10a in FIG. 3 may be said to have a 3-inch diameter. The liquid flows through the pipe 10 in the direction of the arrows 12.

My apparatus has been indicated generally by the reference numeral 14 in FIGS. 1 and 2, and by the reference numeral 14a in FIG. 3. Actually, the apparatus 14a differs from the apparatus 14 in that a greater number of permanent magnet units 16 is employed in FIG. 3 owing to the larger diameter pipe 10a. It is thought that the versatility of my invention is demonstrated in presenting both FIGS. 2 and 3.

As just indicated, each of the permanent magnet units utilized when practicing my invention has been denoted generally by the reference numeral 16. As the description progresses, it will be appreciated that various combinations of these units 16 may be utilized for treating the fluid flowing through either the pipe 10 or the pipe 10a (as well as other sizes of pipes). From FIGS. 1 and 2 it will be noted that the apparatus 14 includes three units 16, whereas in FIG. 3 the apparatus 14a includes four units 16.

Each permanent magnet unit 16 has a thin plastic trough-like casing 18 which includes a top wall 18a, slightly diverging side walls 18b, somewhat diverging end walls 18c and an open side at 18d. It is believed obvious that the top wall 18a, while termed a top wall, will not always be uppermost, the position of the wall 18a actually depending upon the orientation and position of the particular unit 16 on the pipe 10 or the pipe 10a. Attention is directed, though, to the free or lower edges of the side walls 18b and the end walls 18c, for they merge into a channel-like configuration which includes a curved flange 18e. It should be explained at this stage that the flange 18e is somewhat deformable in order to allow the casing 18 to be firmly clamped in place on the pipe 10 or 10a. It will be seen that the top wall 18a includes separated longitudinal portions 18aa and 18ab that extend above a central notch 18ac. Thus, the top wall 18a is composed of the portions 18aa, 18ab and 18ac.

Within the casing 18 is a permanent magnet means indicated generally by the reference numeral 20. The permanent magnet means 20 includes a ferromagnetic strip 22 that resides in the casing 18 in close proximity to the wall 18a. More specifically, the ferromagnetic strip 22 is of soft iron.

Included in the permanent magnet means 20 are permanent magnets in the form of ceramic wafers 24 and 26 at one end of the strip 22. At the other end of the strip 22 is an additional pair of permanent magnet means constituting two additional rectangular ceramic wafers 28 and 30. It will be appreciated that the magnets 24, 26, 28 and 30 each have opposite sides residing in parallel planes. Also, it can be explained that the magnet 24 has a side or face constituting a north pole, such face being labeled 24N and a face constituting a south pole, the latter being identified with the reference numeral 24S. Similarly, the magnet 26 has a north pole 26N and a south pole 26S. Still further, the magnet 28 has a north pole 28N and a south pole 28S, whereas the magnet 30 has a north pole 30N and a south pole 30S.

The strip 22 has parallel sides. The face of the magnet 24 providing the north pole 24N is oriented so as to bear against one end portion of the strip 22, whereas the south pole of the magnet 28 labeled 28S bears against the opposite end portion of the strip 22.

The pair of permanent magnets 24, 26 have associated therewith a ferromagnetic shoe 32, of soft iron, whereas the pair of magnets 28, 30 have a similar shoe 34. The shoes 32 and 34 eac have a flat surface 32a and 34a, respectively, that bear against the face 26S of the magnet 26 in one instance and the face 30N of the magnet 30 in the other. The shoe 32 has an angled face formed with flat surfaces 32b and 32c which extend obtusely with respect to each other. Similarly, the shoe 34 had surfaces labeled 34b and 34c. These V-shaped surfaces 32b, 32c and 34b, 34c bear against the exterior of the pipe 10 or 10a, as the case may be.

Within each casing 18 is an appropriate potting compound 36, such as an epoxy resin containing an appropriate curing agent. The potting compound 36 is somewhat resilient, yet effectively retains the magnetic structure 20 within the confines of the casing 18. It will be recognized that the shoe faces 32b, 32c and 32b, 34c project beyond the casing 18 and also beyond the surface of the potting compound 36 adjacent the open side 18d of the casing 18.

The apparatus 14 includes a clamping means indicated generally by the reference numeral 40. The clamping means 40 comprises a number of metallic straps 42 providing what might be termed in each instance a U-shaped configuration composed of a bight or connecting portion 44 that is nested or saddled in the previously mentioned notch 18ac formed in the wall 18a of the casing 18. The bight or connecting portion 44 has a pair of legs 46 diverging therefrom. At the free end of each leg 46 is a foot 48 that extends substantially perpendicularly from the end of the leg 46 with which it is integrally associated. Each foot 48 has a flange 50 that resides in a plane generally parallel to the plane of of the leg 46 to which its foot 48 is attached. Each foot 48 is formed with a hole 52 (FIG. 4) therein for the accommodation of a bolt or screw 54 having a round head 56 with a screwdriver slot 58 therein. The end of the screw 54 remote from its head 56 has a nut 60 threadedly attached thereto.

A comparison of FIGS. 2 and 3 will reveal that whatever number of straps 42 that are needed can be used in the clamping means 40. For instance, FIG. 2 (and FIG. 1) depicts three units 16 for a somewhat smaller pipe 10 than the pipe 10a in FIG. 3 so three metal straps 42 are employed to clamp the three units 16 in an angularly spaced relation with each other, more specifically, with the angle of 120° therebetween. On the other hand, since FIG. 3 shows four units 16 quadrantly located, there would be four clamping strips or straps 42. A somewhat larger pipe than that appearing in FIG. 3 would require an even greater number of units 16. It will be understood that my invention allows any practical combination of units 16 to be utilized depending on the particular size of pipe that is to make use of my invention.

It will also be appreciated, though, that when the various nuts 60 are tightened on the screws 54, the units 16 are pulled against the outside of the pipe 10 or 10a by the straps 42. The casing 28 in each instance, as well as the structure 20 and compound 36 contained in each casing 18, are all placed under compression, consequently, there is virtually no likelihood of any breakage taking place irrespective of the extent to which the screws 54 and nuts 60 are tightened. This is so irrespective of the number of units 16 utilized at any given pipe site.

Thus, while my invention permits any combination of units 16 to be employed, it permits these units to be clamped very readily without altering the piping system. Furthermore, should it be found that the units 16 should be moved, they can be readily shifted along a straight section of pipe by merely loosening the nuts 60. If it should turn out that a given length of pipe does not require any nuts 16, such as by clamping the type of liquid flowing therethrough, my invention enables an easy removal of the units 16, and if needed elsewhere they can be transferred to a different location where their presence is required, being easily reclamped in place.

Figure 5:
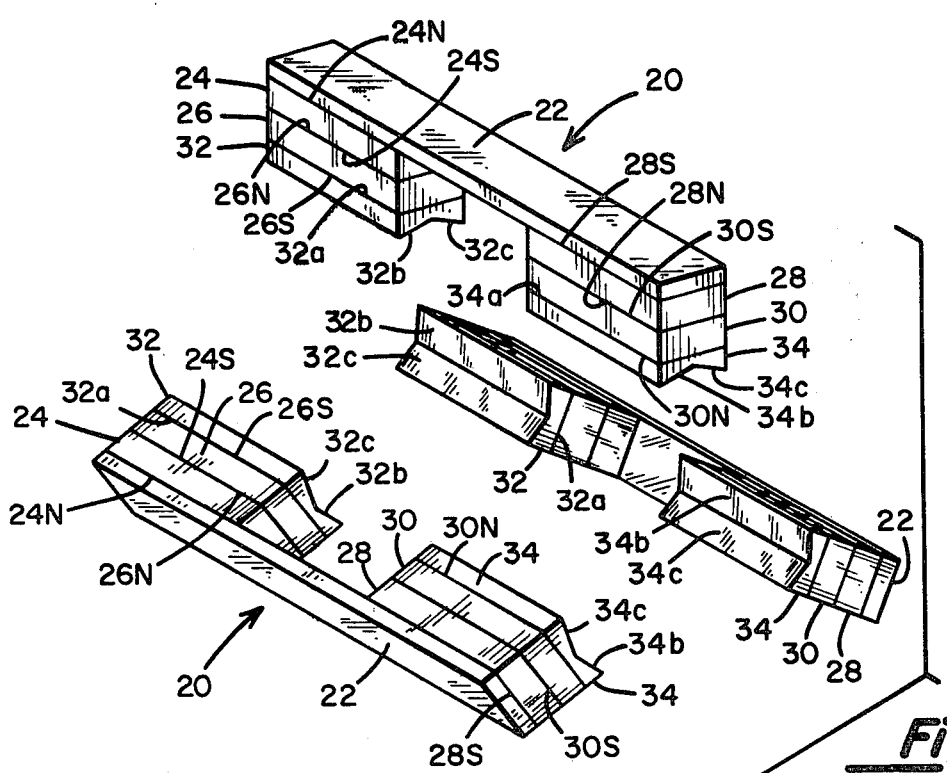
FIG. 5 is an enlarged perspective view, also at the same angle as FIG. 1, showing the internal permanent magnet means for each of the three units, the casing and potting compound having been removed.

For best results the pipe 10 or 10a should be plastic, copper, or stainless steel, although the invention will be useful on galvanized iron pipes. Obviously, when employing a plurality of units 16, as the invention contemplates, the units 16 should be attached so that their polarities are all the same. Preferably, the north poles should all be downstream, the structures 20 as oriented in FIG. 5 being so arranged. Stated somewhat differently, the units 16 would be clamped to the pipe 10 in FIG. 1 with all of the shoes 34 downstream and all of the shoes 32 upstream.

I claim:

1. Apparatus for magnetically treating a liquid flowing through a pipe comprising a casing having a closed side and an opposite open side, first and second longitudinally spaced permanent magnet means in said casing, each magnet means having oppositely directed first and second rectangular surfaces providing first and second flat pole faces, said first rectangular surfaces residing in one plane and second second rectangular surfaces residing in a second plane parallel to said first plane, a ferromagnetic strip member having a length equal to the combined length of said first rectangular surfaces, and the distance therebetween, said strip member confronting said first rectangular surfaces and extending between said first and second permanent magnet means, a first ferromagnetic shoe member having a flat side confronting the second rectangular surfaces of said first permanent magnet means, and a second ferromagnetic shoe member having a flat side confronting the second rectangular surfaces of said second permanent magnet means, said shoe members each having an angled side opposite the flat side thereof bearing against the outside of the pipe having the liquid to be treated flowing therethrough, potting compound in said casing, said angled sides extending beyond said open side of the casing and also projecting beyond said potting compound, and means for clamping said casing to cause said angled sides to bear against the outside of the pipe.

2. Apparatus in accordance with claim 1 in which said clamping means includes a strip and said casing has a notch portion therein for receiving there in a portion of said strip, said strip including a central bight portion receivable in said notch portion, leg portions integral with said bight portion and forming generally a U-shaped configuration with said bight portion, and means at the free end of each leg for pulling said leg portions in a direction to cause said bight portion of said strip to press against the notch portion of said casing to force said shoe members against said pipe at longitudinally spaced locations.

3. Apparatus in accordance with claim 1 in which each of said permanent magnet means includes a plurality of ceramic wafers.

4. Apparatus in accordance with claim 3 in which said wafers have a rectangular configuration.

5. Apparatus for magnetically treating a liquid flowing through a pipe comprising a plastic casing a first pair of rectangular permanent magnets, a second pair of rectangular permanent magnets longitudinally spaced from said first pair of magnets, a ferromagnetic strip extending between said pairs of permanent magnets and spanning the space therebetween, one side of one magnet of each of said pairs of permanent magnets confronting an end portion only and said strip to leave an intermediate portion of said strip therebetween, a first ferromagnetic shoe member having a flat side confronting one side of the other magnet of said first pair of magnets, and a second ferromagnetic shoe member having a flat side confronting one side of the other magnet for said second pair of magnets, said flat side of said shoe members having a surface area corresponding to the surface area of said one side of each of said other magnets said ferromagnetic strip and said permanent magnets being contained in said casing, potting compound encasing the end portions and the intermediate portion of said strip and also said magnets, said shoe members projecting beyond said casing and compound, and strap means for clamping said casing in a direction to force said projecting shoe members against the pipe through which the liquid to be treated flows.

6. In combination with a pipe having a liquid flowing therethrough which is to be magnetically treated, apparatus for treating said liquid comprising a plurality of permanent magnet units, each unit including an elongated plastic casting having an open side, respective permanent magnet means longitudinally spaced from each other in said casing and located adjacent the ends thereof, a ferromagnetic strip extending between said respective magnet means, said strip having a length equal to the length of said magnets and said spacing and a ferromagnetic shoe member associated with each permanent magnet means and having a length corresponding to the length of the magnet unit with which it is associated, said shoe members projecting through said open side, and clamping means engaging the casing of each unit to clamp said units so that said shoe members bear against the outside of said pipe.

7. The combination of claim 6 in which said clamping means includes a strap member for each unit, each strap member having an intermediate portion thereof contacting the casing of the unit it is to clamp, and threaded members acting on the ends of said strap members and pull said strap members in a direction to cause said shoe members to bear against said pipe.

8. The combination of claim 7 in which the ends of said strap members are outturned and each outturned ends has a hole therein for the accommodation of a threaded member.

9. The combination of claim 8 in which each casing has a notch portion, said intermediate strap portion containing said notch portion in each instance.

10. Apparatus for magnetically treating a liquid flowing through a pipe comprising a casing have a closed side and an opposite open side, said closed side of the casing having a notch portion, first and second spaced permanent magnet means disposed within said casing, each magnet means having oppositely directed first and second flat pole faces, said first pole face residing in one plane and said second pole face residing in a second plane parallel to said first plane, a ferromagnetic strip member confronting said first pole faces and extending between said first and second permanent magnet means, a first ferromagnetic shoe member having a flat side confronting the second flat pole face of said first permanent magnet means, and a second ferromagnetic shoe member having a flat side confronting the second flat pole face of said second permanent magnet means, said shoe members each having an angled side opposite the flat side thereof for bearing against the outside of the pipe having the liquid to be treated flowing therethrough, potting compound in said casing, said angled sides of each shoe members extending beyond said open side of the casing and also projecting beyond said potting compound so as to bear against the outside of the pipe, a clamping strip including a bight portion receivable in said notch portion, leg portions integral with said bight portions and forming generally a U-shaped configuration with said bight portion, outturned feet at the free ends of said leg portions for the accommodation of bolt or screw members for pulling said leg portions in a direction to cause said bight portion of said clamping strip to press against the notch portion of said casing to cause said shoe members to bear against said pipe at longitudinally spaced locations.

* * * * *

UNITED STATES PATENT AND TRADEMARK OFFICE
CERTIFICATE OF CORRECTION

PATENT NO. : 4,367,143
DATED : January 4, 1983
INVENTOR(S) : Roland K. Carpenter It is certified that error appears in the above-identified patent and that said Letters Patent are hereby corrected as shown below:

In the ABSTRACT, in line 2, "thereof associ-" should be -- thereof. Associ- --; in line 3, "magnetics" should be -- magnets --.

In column 3, line 29, "in" should be -- by --.

In column 4, line 21, "eac" should be -- each --; in column 4, line 26, "had" should be -- has --; in column 4, line 35, "32b" (second occurrence) should be -- 34b --; in column 4, line 51, "of" (second occurrence) should be deleted; in column 4, line 65, "the" should be -- an --.

In claim 1, column 5, line 49, "second" (first occurrence) should be -- said --.

In claim 5, column 6, line 19, after "casing" there should be a comma (,); in claim 5, column 6, line 26, "and" should be -- of --; in claim 5, column 6, line 31, "for" should be -- of --.

In claim 6, column 6, line 47, "casting" should be -- casing --.

In claim 8, column 7, line 1, "ends" should be -- end --.

Signed and Sealed this

Tenth Day of May 1983

[SEAL]

Attest:

GERALD J. MOSSINGHOFF

Attesting Officer      Commissioner of Patents and Trademarks